May 31, 1932. A. C. MARSHALL 1,860,839
CLAMP FOR SCAFFOLDING FOR BUILDING AND OTHER PURPOSES
Filed June 18, 1929  2 Sheets-Sheet 2
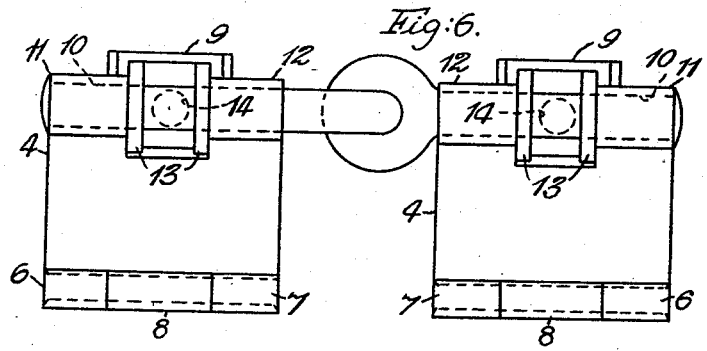
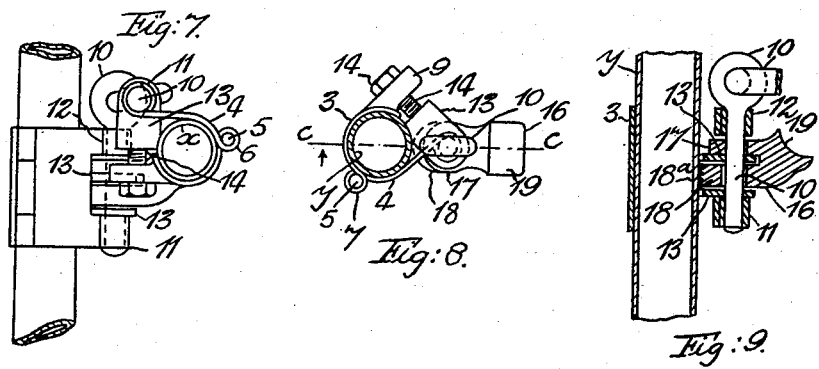
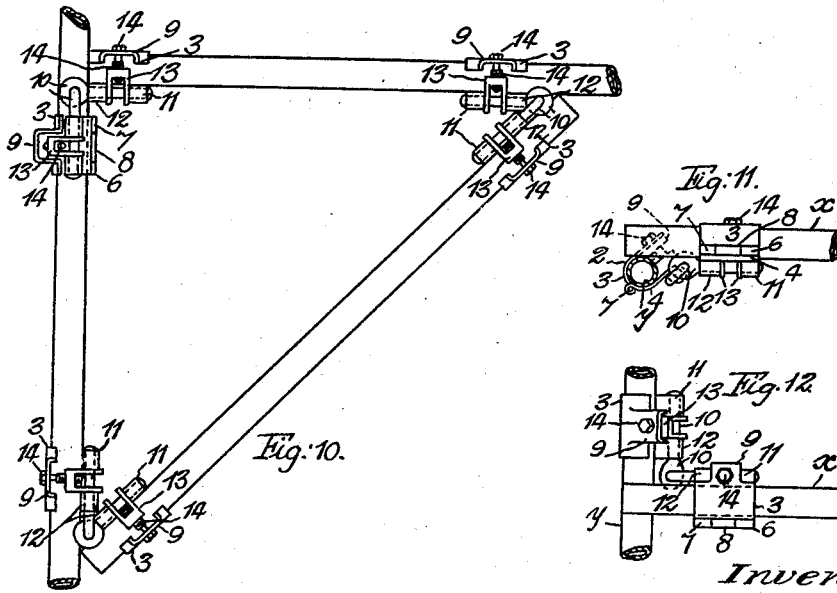
Inventor;
Arnold Clarence Marshall,
By his Att'y, Patented May 31, 1932

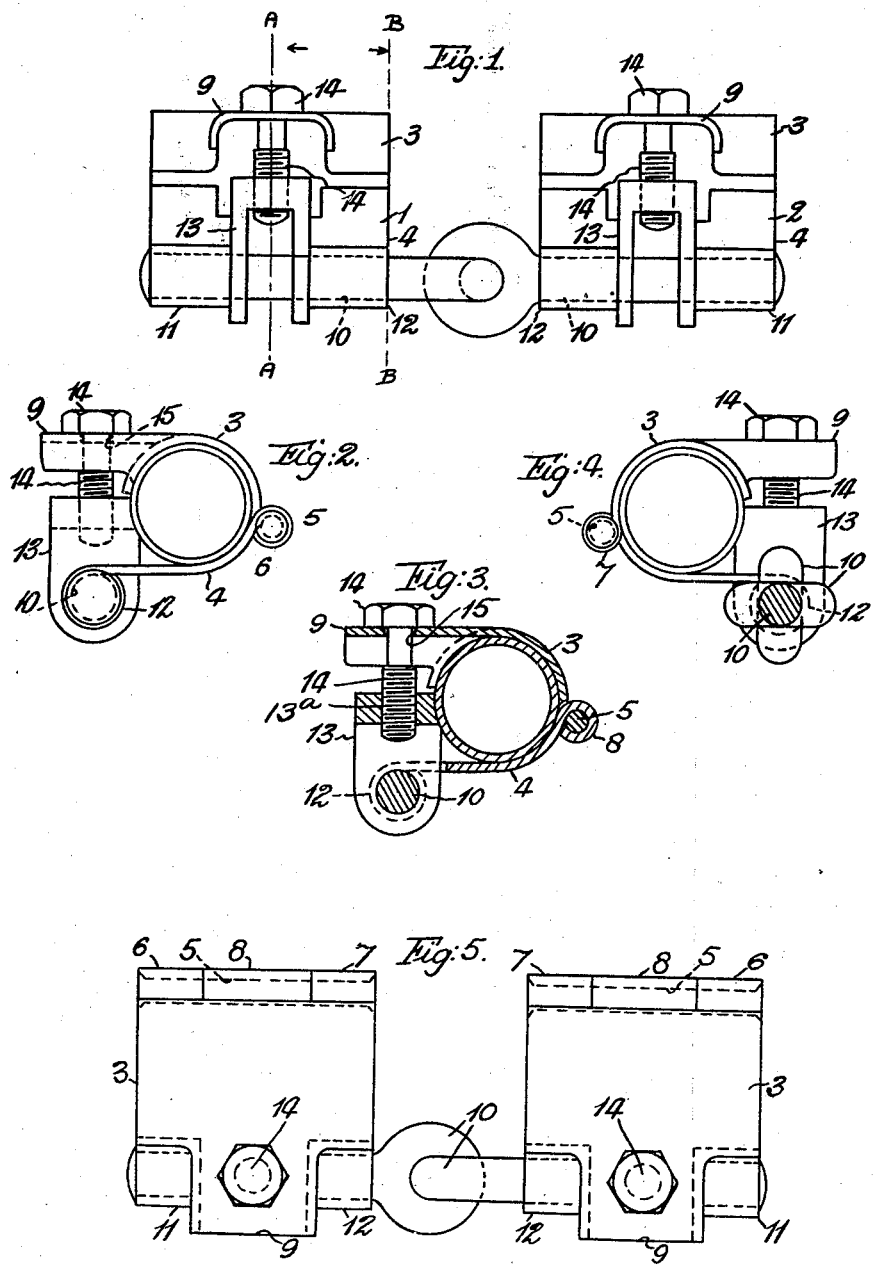

1,860,839

UNITED STATES PATENT OFFICE

ARNOLD CLARENCE MARSHALL, OF LONDON, ENGLAND, ASSIGNOR TO THE STEEL SCAFFOLDING COMPANY LIMITED, OF LONDON, ENGLAND, A CORPORATION OF GREAT BRITAIN

CLAMP FOR SCAFFOLDING FOR BUILDING AND OTHER PURPOSES

Application filed June 18, 1929, Serial No. 371,929, and in Great Britain July 16, 1928.

This invention relates to a clamp for building or other purposes and it has for its object to provide a clamp whereby two bodies may be secured in axial alignment or at any desired angle one to the other. The invention further provides for the support of a body at a right angle to the line of the body by which it is supported.

According to the present invention the clamp comprises two clamps or parts connected by means of a universal joint whereby the said parts are relatively adjustable at any desired angle with respect to each other. One or both of the aforesaid parts is provided with a pivotally mounted member, one end of which engages with the body to which the clamp member is attached whilst the other is adapted to engage and support another body running at a right angle to the line of the clamp carrying said pivotally mounted body.

The arrangement of the parts is such that weight thrown upon the transverse body acts to force the end of the pivoted body into close engagement with the supporting body so that the greater said weight the firmer will be the connection of the clamp as a whole to the supporting body.

To increase the holding effect the surface of engagement of the pivoted body may be serrated or roughened in any suitable manner.

I have found in practice that a sufficiently firm connection may be obtained with the use of the pivotally mounted serrated member, and that same may under some circumstances be dispensed with.

In order that the invention may be the better understood drawings are appended showing one form of the invention, in which:—

Fig. 1 is a front view of a clamp according to the present invention.

Fig. 2 is an end view.

Fig. 3 is a transverse section on line A—A Fig. 1.

Fig. 4 is a transverse section on line B—B Fig. 1.

Fig. 5 is a plan of the upper side.

Fig. 6 is a plan of the underside.

Fig. 7 is a view showing one application of a modification of the device.

Fig. 8 is a plan view of the modification.

Fig. 9 is a section on line C—C Fig. 8.

Fig. 10 is a view showing a further application of the clamp.

Fig. 11 is a view showing a further method of employing the clamp to secure horizontal members of a structure to one another.

Fig. 12 is a plan.

Referring to the accompanying drawings 1 and 2 indicate clamps which each comprise two approximately semi-circular members indicated by 3 and 4 designed to partially surround the scaffold pole or other structural member, the said members 3 and 4 of each clamp being hingedly connected one to the other by means of a pin 5 which passes through drilled lugs 6, 7, formed upon the member 4 and a similar lug 8 formed upon the member 3.

Formed integral with each member 3 and projecting tangentially therefrom is a projection 9. 10, 10, indicate eye-bolts by means of which the clamps 1 and 2 are connected one to the other, the said eye-bolts each being carried within bearings or bodies 11, 12, disposed in spaced relationship and formed upon the members 4.

In order to clamp the members 3 and 4 upon the scaffold poles $x$ and $y$ indicated in Figs. 7, 8, 9, 11 and 12, there is pivotally mounted upon each of the eye-bolts 10 between the bodies 11 and 12, in Fig. 1, a substantially U shaped body 13, the limbs of which are drilled to enable the eye-bolts to pass therethrough.

14 indicates a bolt which passes through a perforation 15 formed in the upper portion of the projection 9, the diameter of the said bolt where it passes through the aforesaid projection being reduced somewhat, the metal of the said projection after the bolt has been passed therethrough being pressed or otherwise treated to cause it to encircle the reduced part of the said bolt thereby preventing its withdrawal or accidental displacement from the projection.

The cross member of the body 13 is provided with a screw threaded perforation $13^a$ with which engages the screw threaded portion of the bolt 14 whereby when the said bolt is screwed into position the members 3 and 4 are drawn together and clamped tightly round the pole.

The upper and inner portion of each member 13 is provided with a groove or recess of such shape as to conform to the shape of the scaffold pole or other body and firmly grip the same as the bolt 14 is tightened up, and whereby a wedge like action is produced between the inner and upper end of the said body 13 and the scaffold pole.

16 in Figs. 7, 8 and 9 indicates a body provided at one extremity with a forked portion comprising members 17 and 18, both of which are perforated for the passage of the eyebolt 10 of the clamp 2, and upon which eyebolt the body 16 is pivotally mounted, the perforations being of such size as to permit the said body to rock upon the eye-bolt. The member 18 of the forked portion of the body 16 is of somewhat greater length than the member 17 and is provided upon its end with a roughened or serrated portion 18$^a$ designed to engage the tube or other body upon which the clamp is disposed.

The body 16 at its free end is provided with a concave portion 19 so disposed that when the clamp 1 is in the position shown in Fig. 7 the body or member carried by this clamp rests upon the said concave portion 19 and acts to force the portion 18$^a$ hard against the body upon which the clamp 2 is disposed.

From the foregoing, it will be readily understood that the body 16 not only serves to assist in gripping the pole in the clamp 2 but also serves to support the pole carried by the clamp 1. If desired both clamps may be provided with bodies such as 16.

As in practice it has been found in many cases that a sufficiently firm connection between the members of the scaffolding or the like may be obtained without the employment of bodies such as 16, these bodies have been shown only in Figs. 7, 8 and 9.

In Fig. 10 two applications of the clamp are shown in which a horizontal member is secured to a vertical member, and a brace is secured between the vertical and horizontal members.

Figs. 11 and 12 illustrate one method of securing two horizontal members together.

I claim:

1. A clamp for the purpose specified comprising two gripping elements, a body revolubly carried by one of said gripping elements, an eye upon said body, a body upon said second gripping element and an eye upon said second body engaging the eye of said first body.

2. A clamp for the purpose specified comprising two gripping elements each comprising two hingedly connected members cooperating to grip a body, means for drawing said members together, a body upon each of said elements provided with an eye, the eye of one body engaging the eye of the second body, each of said bodies being revolubly carried by said elements.

3. A clamp for the purpose specified comprising a gripping element comprising two hingedly connected members cooperating to grip a body, means for drawing said members together, projections upon one of said members, perforations in said projections, a body revolubly secured within said perforations and having its longitudinal axis parallel with the axis of the body gripped, an eye upon one end of said body, a second gripping element comprising two hingedly connected members cooperating to grip a body, means for drawing said members together, projections upon one member of said second gripping element, perforations in said projections, a body fixedly engaging said perforations and having its longitudinal axis parallel with the axis of the body gripped by said second element, and an eye upon one end of said body engaging the eye of the revoluble body carried by the first element.

4. A clamp for the purpose specified comprising a gripping element comprising two hingedly connected members cooperating to grip a body, means for drawing said members together, projections upon one of said members, perforations in said projections, a body revolubly secured within said perforations and having its longitudinal axis parallel with the axis of the body gripped, an eye upon one end of said body, a second gripping element comprising two hingedly connected members cooperating to grip a body, means for drawing said members together, projections upon one member of said second gripping element, perforations in said projections, a body revolubly secured in said perforations and having its longitudinal axis parallel with the axis of the body gripped by said second element, and an eye upon one end of said body engaging the eye of the revoluble body carried by the first element.

5. A clamp for the purpose specified comprising two gripping elements, each comprising two hingedly connected members cooperating to grip a body; a body revolubly carried by one of said gripping elements; an eye upon said body; a body carried by said second gripping element; an eye upon said second body engaging the eye of said first body; a substantially U shaped body pivotally mounted upon each of said eye carrying bodies; a screw threaded perforation in each of said U shaped bodies; a perforation in one member of each gripping element; screws passing through said latter perforations and engaging with said screw threaded perforations to thus draw the parts of the respective gripping elements together; an arm pivotally mounted upon one of said eye carrying bodies, one end of said arm bearing against the body held by one gripping element and the other end bearing against the body held by the other gripping element.

6. A clamp for the purpose specified comprising two gripping elements, each comprising two hingedly connected members cooperating to grip a body, a body revolubly carried by one of said gripping elements; an eye upon said body; a body revolubly carried by said second gripping element; an eye upon said second body engaging the eye of said first body, a substantially U shaped body pivotally mounted upon each of said eye carrying bodies, a screw threaded perforation in each of said U shaped bodies; a perforation in one member of each gripping element; screws passing through said latter perforations and engaging with said screw threaded perforations to thus draw the parts of the respective gripping elements together; an arm pivotally mounted upon one of said eye carrying bodies, one end of said arm bearing against the body held by one gripping element and the other end bearing against the body held by the other gripping element.

7. A clamp for the purpose specified comprising two gripping elements, each comprising two hingedly connected members cooperating to grip a body; a body revolubly carried by one of said gripping elements; an eye upon said body; a body carried by said second gripping element; an eye upon said second body engaging the eye of said first body; a substantially U shaped body pivotally mounted upon each of said eye carrying bodies; a screw threaded perforation in each of said U shaped bodies; a perforation in one member of each gripping element; screws passing through said latter perforations and engaging with said screw threaded perforations to thus draw the parts of the respective gripping elements together; an arm pivotally mounted upon one of said eye carrying bodies, one end of said arm being suitably shaped to engage the body held by one gripping element and the other end being provided with a serrated surface to engage the body held by the second gripping element.

8. A clamp for the purpose specified comprising two gripping elements, each comprising two hingedly connected members cooperating to grip a body, a body revolubly carried by one of said gripping elements; an eye upon said body; a body revolubly carried by said second gripping element; an eye upon said second body engaging the eye of said first body, a substantially U shaped body pivotally mounted upon each of said eye carrying bodies, a screw threaded perforation in each of said U shaped bodies; a perforation in one member of each gripping element; screws passing through said latter perforations and engaging with said screw threaded perforations to thus draw the parts of the respective gripping elements together; an arm pivotally mounted upon one of said eye carrying bodies, one end of said arm being suitably shaped to engage the body held by one gripping element and the other end being provided with a serrated surface to engage the body held by the second gripping element.

9. A clamp for the purpose specified comprising two gripping elements each comprising two hingedly connected members cooperating to grip a body; a body revolubly carried by one of said gripping elements; an eye upon said body; a body carried by said second gripping element; an eye upon said second body engaging the eye of said first body; a substantially U shaped body pivotally mounted upon each of said eye carrying bodies; a screw threaded perforation in each of said U shaped bodies; a perforation in one member of each gripping element, screws passing through said latter perforations and engaging with said screw threaded perforations to thus draw the parts of the respective gripping elements together; a curved recess upon each of said U shaped bodies adapted, when the members of the gripping elements are drawn together, to engage the body gripped.

10. A clamp for the purpose specified comprising two gripping elements each comprising two hingedly connected members cooperating to grip a body; a body revolubly carried by one of said gripping elements; an eye upon said body; a body carried by said second gripping element; an eye upon said second body engaging the eye of said first body; a substantially U shaped body pivotally mounted upon each of said eye carrying bodies; a screw threaded perforation in each of said U shaped bodies; a perforation in one member of each gripping element, screws passing through said latter perforations and engaging with said screw threaded perforations to thus draw the parts of the respective gripping elements together; a curved recess upon each of said U shaped bodies adapted, when the members of the gripping elements are drawn together, to engage the body gripped, an arm pivotally mounted upon one of said eye carrying bodies, one end of said arm bearing against the body held by one gripping element and the other end bearing against the body held by the other gripping element.

In testimony whereof I have hereunto set my hand.

ARNOLD CLARENCE MARSHALL.